(12) United States Patent
Bilinski et al.

(10) Patent No.: US 8,793,255 B1
(45) Date of Patent: Jul. 29, 2014

(54) GENERATING A REPUTATION SCORE BASED ON USER INTERACTIONS

(71) Applicant: Google Inc., Mountain View, CA (US)

(72) Inventors: Brandon Bilinski, San Francisco, CA (US); Alexander Collins, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

(21) Appl. No.: 13/651,628

(22) Filed: Oct. 15, 2012

Related U.S. Application Data

(60) Provisional application No. 61/645,960, filed on May 11, 2012.

(51) Int. Cl.
*G06F 17/30* (2006.01)

(52) U.S. Cl.
USPC .......................................... 707/740; 707/748

(58) Field of Classification Search
CPC .............. G06F 17/212; G06F 17/3053; G06F 17/30648; G06F 17/2247; G06F 17/24; G06F 17/28; G06F 17/30058; G06F 17/30312; G06F 17/30554; G06F 17/30595; G06F 17/30598; G06F 17/30902; G06F 17/30958; G06F 17/30964; G06F 17/30486; G06F 17/30241; G06F 17/30867; G06F 17/30905; G06F 17/30994; G06F 17/30584; G06F 17/3048

USPC .................................................... 707/740, 748
See application file for complete search history.

(56) References Cited

U.S. PATENT DOCUMENTS

| | | |
|---|---|---|
| 8,036,937 B2 * 10/2011 | Tang et al. | 705/14.46 |
| 2008/0243628 A1 * 10/2008 | Wiseman et al. | 705/26 |
| 2012/0089617 A1 * 4/2012 | Frey | 707/748 |
| 2012/0209832 A1 * 8/2012 | Neystadt et al. | 707/723 |
| 2013/0064188 A1 * 3/2013 | Tseng et al. | 370/329 |
| 2013/0159132 A1 * 6/2013 | Adams | 705/26.7 |
| 2013/0282811 A1 * 10/2013 | Lessin et al. | 709/204 |

\* cited by examiner

*Primary Examiner* — Pierre Vital
*Assistant Examiner* — Andalib Lodhi
(74) *Attorney, Agent, or Firm* — Patent Law Works LLP

(57) ABSTRACT

A system and method for generating a reputation score is disclosed. A processing unit processes user activity data from data sources to identify user interactions associated with a user. A categorizing engine categorizes the user interactions into categories. A social bonus engine determines a social bonus score based on social affinity data. A scoring engine computes a first reputation score for the user by combining scores for the categorized user interactions with a social bonus score. A learning engine receives a second set of user interactions and training data and generates a learning result that is used to update the first reputation score.

20 Claims, 8 Drawing Sheets

GENERATING A REPUTATION SCORE BASED ON USER INTERACTIONS

CROSS REFERENCE TO RELATED APPLICATIONS

This application claims priority under 35 USC §119(e) to U.S. Application No. 61/645,960, entitled "Generating a Reputation Score Based on User Interactions" filed May 11, 2012, the entirety of which is herein incorporated by reference.

BACKGROUND

The specification relates to generating a reputation score for a user in a social network that measures the trustworthiness of the user by processing user interactions associated with the user from data sources.

The trustworthiness of a social network user becomes more and more important as people rely on the internet as a source for legitimate information. For example, people want to know if an owner of an online store is honest and trustworthy in order to determine whether to purchase an item from the store. One way to help indicate the trustworthiness of the user is to generate a score for the user that measures the trustworthiness of the social network user.

It is difficult to determine whether a user is trustworthy by his or her online activities. For example, if the user posts a comment for an item, it is difficult to determine whether the user is a spammer, misinformed or untrustworthy based on the content in the comment. In addition, scoring systems have difficulty distinguishing between users and bots or spam when scoring user interactions.

SUMMARY

In general, one innovative aspect of the subject matter described in this disclosure may be embodied in methods that include receiving a first set of user activities from data sources, processing, with one or more computing devices, the first set of user activities to identify user interactions associated with a first user of a social network, classifying the first set of user activities into at least one category, generating a base score for each category of user interactions including normalizing at least some of the user interactions for the at least one category and determining a first reputation score for the first user based at least in part on the base score for each category of user interactions. Other aspects include corresponding methods, systems, apparatus, and computer program products.

According to another innovative aspect of the subject matter described in this disclosure, a categorizing engine receives a first set of user activities from data sources, processing, with one or more computing devices, the first set of user activities to identify user interactions associated with a first user of a social network and classifying the first set of user activities into at least one category and a scoring engine coupled to the categorizing engine, the scoring engine generating a base score for each category of user interactions including normalizing at least some of the user interactions for the at least one category and determining a first reputation score for the first user based at least in part on the base score for each category of user interactions.

These and other implementations may each optionally include one or more of the following features. For instance, operations further include receiving a second set of user activities from the data sources, the second set of user activities including training data that identifies user activities associated with a trustworthy user and user activities associated with an untrustworthy user, generating a learning result based at least in part on the second set of user activities and determining, with the one or more computing devices, a second reputation score for the first user based at least in part on the learning result. Operations further include extracting features from the first set and the second set of user activities and wherein the second reputation score includes at least one adjustment for at least one of the first base score, the first weight, the second base score and the second weight based at least in part on the extracted features. Operations further include determining user metric data for the user interactions and wherein the user metric data includes at least one of time to first click, user interaction time, time between a first user interaction and a current user interaction and a number of user interactions in a certain time period.

For instance, the features further include the normalizing at least some of the user interactions comprising determining a diminishing marginal utility of the user interactions for the at least one category. The features further include the learning result being generated based at least in part on machine learning or regression analysis. The features further include classifying the user interactions associated with the first user by classifying the user interactions into a first category and a second category and wherein determining the first reputation score further comprises determining a first base score and a first weight for each type of user interaction included in the first category of the user interactions, determining a second base score and a second weight for each type of user interaction included in the second category of the user interactions and computing the first reputation score by combining the base scores and the weights for the first and second categories and applying a sum to the combination. The features further include determining the first reputation score by generating a social bonus score based at least in part on social affinity data between the first user and other users in the social network. The features further include determining the first reputation score by determining related user activity data for the user interactions, the related user activity data including other users' reactions to user interactions created by the first user. The features further include excluding user interactions from a second user's stream of content based at least in part on the first reputation score associated with the first user failing to meet a threshold reputation score.

BRIEF DESCRIPTION OF THE DRAWINGS

The specification is illustrated by way of example, and not by way of limitation in the figures of the accompanying drawings in which like reference numerals are used to refer to similar elements.

DETAILED DESCRIPTION

Figure 1:
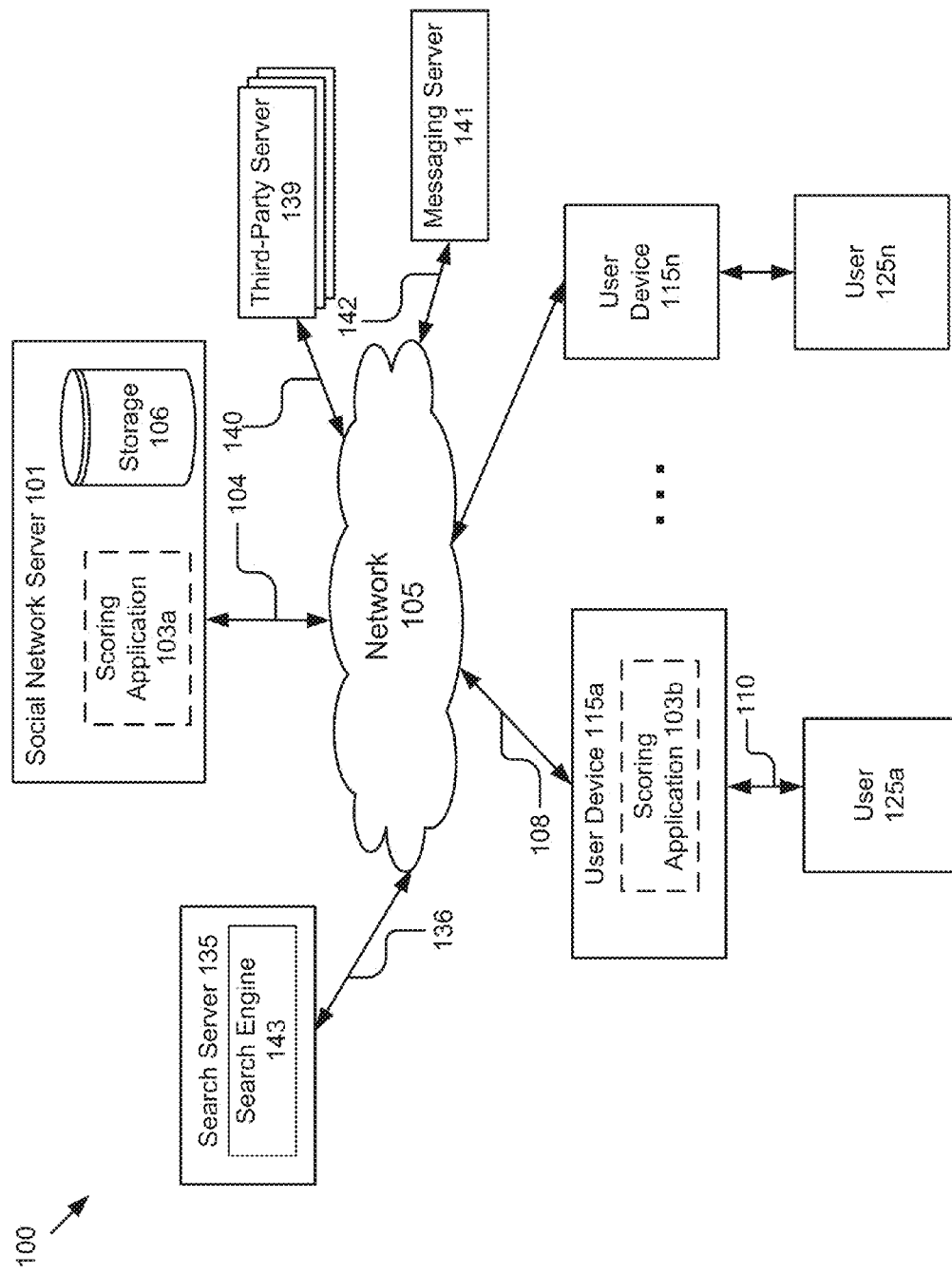
FIG. 1 is a block diagram illustrating an example system for generating a reputation score for a user in a social network.

FIG. 1 illustrates a block diagram of a system 100 for generating a score that measures the trustworthiness of a user in a social network according to some instances. The illustrated system 100 for generating a reputation score includes user devices 115a,115n that are accessed by users 125a,125n, a social network server 101, third-party servers 139, a search server 135 and a messaging server 141. In the illustrated example, these entities are communicatively coupled via a network 105. In FIG. 1 and the remaining figures, a letter after a reference number, for example, "115a" is a reference to the element having that particular reference number. A reference number in the text without a following letter, for example, "115" is a general reference to different instances of the element bearing that reference number. Although only two devices are illustrated, persons of ordinary skill in the art will recognize that arbitrary number of user devices 115n is available to arbitrary number of users 125n.

In some instances, the scoring application 103a is operable on the social network server 101, which is coupled to the network 105 via signal line 104. Although only one social network server 101 is shown, persons of ordinary skill in the art will recognize that multiple servers can be present. The social network includes relationships that are defined in a social graph. The social graph is a mapping of users in a social network and how they are related to each other.

In other instances, the scoring application 103b is stored on a user device 115a, which is connected to the network 105 via signal line 108. In one example, the scoring application 103b is a thin-client application that includes part of the storing application 103 on the user device 115a and part of the storing application 103 on the social network server 101 to generate the reputation score. The user 125a interacts with the user device 115a via signal line 110. The user device 115a, 115n is a computing device that includes a memory (not shown) and a processor (not shown). For example, the user device 115a, 115n is a computing device including a laptop computer, a desktop computer, a tablet computer, a mobile telephone, a personal digital assistant (PDA), a mobile messaging device, a portable game player, a portable music player, a television with one or more processors embedded therein or coupled thereto or other electronic devices capable of accessing the network 105.

The network 105 is a conventional type, wired or wireless, and has arbitrary number of configurations, for example, as a star configuration, token ring configuration or other configurations known to those skilled in the art. Furthermore, the network 105 includes a local area network (LAN), a wide area network (WAN) (e.g., the Internet), and/or other interconnected data paths across which multiple devices can communicate. In yet other instances, the network 105 is a peer-to-peer network. The network 105 is also coupled to or includes portions of a telecommunications network for sending data in a variety of different communication protocols. In some instances, the network 105 includes Bluetooth communication networks or a cellular communications network for sending and receiving data, for example, via short messaging service (SMS), multimedia messaging service (MMS), hypertext transfer protocol (HTTP), direct data connection, WAP, email, etc.

The scoring application 103 generates a reputation score based at least in part on data describing user interactions received from data sources. The user interactions are from a variety of sources including social acknowledgements and user-generated content including posts, ratings, reviews and comments. The data sources include the search server 135, third-party servers 139, the messaging server 141 and user devices 115 as depicted in FIG. 1. The search server 135 performs searches with the search engine 143 and returns search results via signal line 136. The messaging server 141 runs a messaging application including, for example, an email application and transmits information about users to the scoring application 103 via signal line 142. The third-party server 139 generates webpages or applications relating to a variety of topics, for example, entertainment, news, finance, retail, etc. and transmits information to the scoring application 103 via signal line 140.

The reputation score measures trustworthiness of a user based at least in part on user interactions associated with the user. The more the user engages in user interactions in appropriate ways (e.g., non-spamming ways), the more trustworthy the user tends to be and the higher the reputation score is (or lower if a lower score indicates a more trustworthy person). The scoring application 103 processes user activity data from data sources to identify user interactions associated with a user, categorizes the user interactions, determines base scores and weights for each type of user interaction included in each category and computes a reputation score for the user.

In some instances, the scoring application 103 generates a social bonus score that incorporates social affinity between the user and recipients of the user interactions. The social affinity data is used to compensate for offline signals that are not received by the system including trust metrics. The social bonus score is calculated for each user and recipient pair. In other instances, the scoring application 103 receives user interaction data associated with known trustworthy and untrustworthy users and applies machine learning or logistic regression to generate a learning result that includes additional user interactions, their associated base scores and weights. The scoring application 103 updates the reputation score with the learning result.

The storage device 106 is a non-volatile memory device or similar persistent storage media for storing instructions and/or data used for determining a reputation score based at least in part on user interactions. The storage device 106 is communicatively coupled to the scoring application 103a.

Figure 2:
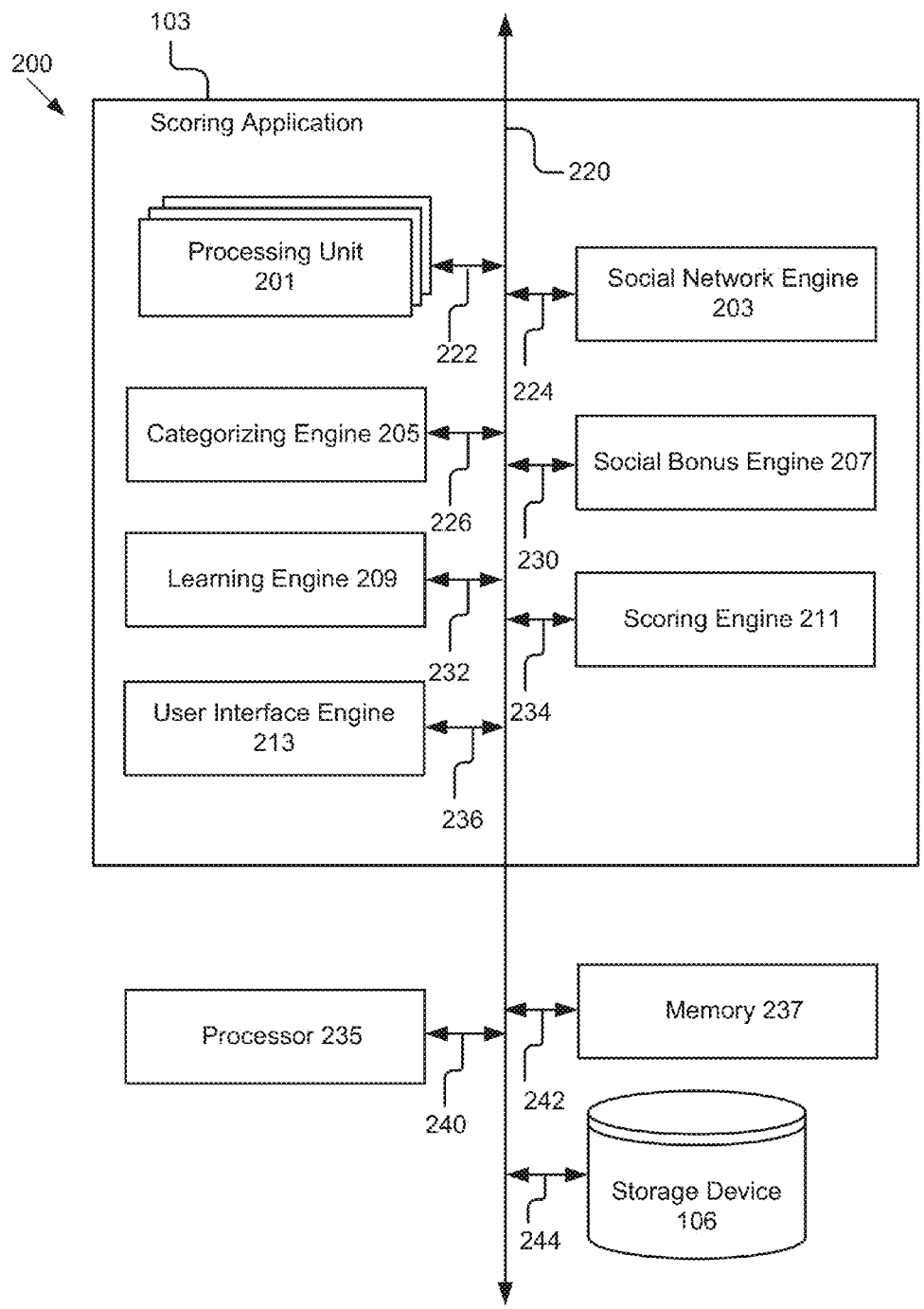
FIG. 2 is a block diagram illustrating an example scoring application.

Referring now to FIG. 2, the scoring application 103 is shown in more detail. FIG. 2 is a block diagram of a computing device 200 that includes the scoring application 103, a processor 235 and a memory 237. In some instances, the computing device 200 is a social network server 101. In other instances, the computing device 200 is a user device 115a.

The processor 235 includes an arithmetic logic unit, a microprocessor, a general purpose controller or some other processor array to perform computations and provide electronic display signals to a display device. The processor 235 is coupled to the bus 220 for communication with the other components via signal line 240. Processor 235 processes data signals and may include various computing architectures including a complex instruction set computer (CISC) architecture, a reduced instruction set computer (RISC) architecture, or an architecture implementing a combination of instruction sets. Although only a single processor is shown in FIG. 2, multiple processors are included. The processing capability may be limited to supporting the display of images and the capture and transmission of images. The processing capability might be enough to perform more complex tasks, including various types of feature extraction and sampling. It will be obvious to one skilled in the art that other processors, operating systems, sensors, displays and physical configurations are possible.

The memory 237 stores instructions and/or data that may be executed by processor 235. The memory 237 is coupled to the bus 220 for communication with the other components via signal line 242. The instructions and/or data may include code for performing any and/or all of the techniques described herein. The memory 237 may be a dynamic random access memory (DRAM) device, a static random access memory (SRAM) device, flash memory or some other memory device known in the art. In some instances, the memory 237 also includes a non-volatile memory or similar permanent storage device and media, for example, a hard disk drive, a floppy disk drive, a CD-ROM device, a DVD-ROM device, a DVD-RAM device, a DVD-RW device, a flash memory device, or some other mass storage device known in the art for storing information on a more permanent basis.

In some instances, the scoring application 103 includes a processing unit 201, a social network engine 203, a categorizing engine 205, a social bonus engine 207, a learning engine 209, a scoring engine 211 and a user interface engine 213.

The processing unit 201 can be software including routines for receiving user activity data from data sources and processing the data. In some instances, the processing unit 201 can be a set of instructions executable by the processor 235 to provide the functionality described below for receiving and processing data. In other instances, the processing unit 201 can be stored in the memory 237 of the computing device 200 and can be accessible and executable by the processor 235. The processing unit 201 may be adapted for cooperation and communication with the processor 235 and other components of the computing device 200 via signal line 222.

In some instances, the processing unit 201 obtains user activity data about users that opt-in to having data collected from user input and/or prior actions of the user across a range of data sources including search (for example, web, video, news, maps, alerts), entertainment (for example, news, video, movies, music, books, a personalized homepage, blogs, a reader, gadget subscriptions), social activity (for example, interactions through email, filling out a online vendor survey form, profile information, text messaging, for example, short message service (SMS), microblogs, geographical locations, comments on photos, and social networking information) and activity on third-party sites (for example, websites that provide a capability for online shopping, ratings, reviews and social networks where users indicate that they approve of content). The processing unit 201 also receives information about user activity in the social network from the social network engine 203 as described in greater detail below.

In some instances, the processing unit 201 processes the user activity data to identify data describing user interactions. User interactions may be extracted from, for example, an atomic social acknowledgement widget and a user-generated content widget. Examples of the atomic social acknowledgement widget include, but are not limited to, a notification widget, a sharebox widget or a checkbox widget that indicates an atomic social acknowledgement. Examples of the user-generated content widget include, but are not limited to, a graphical user interface (GUI) widget or other types of widgets that allow a user to rate, review or comment on an item. In one example, the user interaction describes that a user clicking a sharebox widget to indicate that the comment should be shared with the social network. In another example, the widget interaction describes that the user writing a comment on a blog post using a GUI widget. In some instances, the processing unit 201 identifies one or more user interactions associated with a first user in a social network from the user activity data and stores data describing the one or more user interactions in the storage device 106.

Responsive to identifying the one or more user interactions associated with the first user in the social network, the processing unit 201 processes the user activity data to obtain data related to the one or more user interactions and transmits the related data to the storage device 106. For example, the processing unit 201 identifies the reactions of other users that received user interactions from a first user. The reactions include, for example, atomic social acknowledgements (approval or disapproval), comments in response to the user interactions, sharing and flagging spam or inappropriate content.

In some instances, these user activities include an explicit indication of approval or disapproval of the user interactions associated with the first user. In other instances, these user activities include an implicit indication of users' opinions for the one or more user interactions associated with the first user. For example, the processing unit 201 identifies a user interaction associated with the first user where the first user is shares a post with an acquaintance group in the social network. A second user in the acquaintance group expresses disapproval of the post. A third user in the acquaintance group shares the post shared by the first user to his or her friend group. The processing unit 201 stores the disapproval and the sharing user activities in the storage device 106.

In some instances, the processing unit 201 identifies other users that are involved in the one or more user interactions and includes relationship information between the first user and the entity as a part of the related data associated with the one or more user interactions. In some instances, the entity is a member in the social network, for example, a user, a group or a community. For example, if the user interaction associated with the first user is sharing of a blog post with a second user in the social network, the processing unit 201 stores the social relationship information between the first user and the second user in the storage device 106.

In some instances, the relationship information or the social relationship includes a relationship type, a relationship level, a relationship weight and a degree of separation. The relationship types within the social network include, for example, friendship relationships, business relationships, school relationships or famous people. One user can have multiple types of relationships, for example, a friendship relationship with a second user and a business relationship with a third user. In addition, these relationships can be in one direction, for example, when the first user follows posts from the second user, but the second user does not follow posts from the first user.

In some instances, each type of relationship includes different levels. For example, a friendship relationship has a list of levels including a best friend, a good friend, a regular friend, an acquaintance, and a "haven't met" friend. Each type of relationship or each level of a type of relationship is associated with a relationship weight that represents the relationship strength. For example, a friend relationship has a higher relationship weight than a school relationship and a best friend relationship has a higher relationship weight than a good friend relationship. Furthermore, a degree of separation is determined for a relationship or a type of relationship. A first user that receives user interactions from a second user has a first-degree relationship with the second user. A third user that receives user interactions from the second user, but not the first user, has a second-degree relationship to the first user. In some instances, the information about the relationship type, the relationship level, the relationship weight and the degree of separation is stored in a user profile associated with a user. The user profile is stored in the storage device 106.

In some instances, the processing unit 201 also stores user metrics related to the user interactions, for example, a time that the user interaction occurred, a time between the user interaction first appearing in a user's stream of content and the time the user clicked on the user interaction, a time the user interacted with the user interaction (for example, reading, sharing, commenting).

In some instances, the processing unit 201 receives a first set of user activities at a first time such that a first reputation score of the first user is generated based at least in part on the first set of user activities. The processing unit 201 also collects other sets of user activity data over time, for example, a second set of user activities at a second time and a third set of user activities at a third time. As a result, the reputation score is updated with the more recent information that was received by the processing unit 201.

In some instances, there can be multiple processing units 201 that each receive data from a different data source. In some examples, the data from the different data sources may be stored separately as partitioned data. In other instances, the data may be received by the same processing unit 201. The processing unit 201 processes the data and transmits the processed data to the data storage device 106.

The social network engine 203 can be software including routines for generating and managing a social network. In some instances, the social network engine 203 can be a set of instructions executable by the processor 235 to provide the functionality described below for generating a social network. In other instances, the social network engine 203 can be stored in the memory 237 of the computing device 200 and can be accessible and executable by the processor 235. The social network engine 203 may be adapted for cooperation and communication with the processor 235 and other components of the computing device 200 via signal line 224.

In some instances, the social network engine 203 manages registration of users, creation of a user profile and creation of a social graph that are stored in the storage device 106. The social network engine 203 also manages the association of different actions with the user profile including the publication of posts (e.g. text, links or media) to a selected audience, the publication of comments, atomic social acknowledgements (e.g. approval or disapproval), uploading of media (e.g. photos, videos, etc.), check-ins to different locations and other actions associated with a social network. The social network engine 203 transmits the user activities to the processing unit 201 for processing and organizing with the other data sources.

The categorizing engine 205 can be software including routines for receiving or retrieving data describing user interactions from the storage device 106 and categorizing the user interactions. In some instances, the categorizing engine 205 can be a set of instructions executable by the processor 235 to provide the functionality described below for categorizing the user interactions. In other instances, the categorizing engine 205 can be stored in the memory 237 of the computing device 200 and can be accessible and executable by the processor 235. The categorizing engine 205 may be adapted for cooperation and communication with the processor 235 and other components of the computing device 200 via signal line 226.

The categorizing engine 205 classifies the user interactions associated with a user into different types of user interactions. For example, the categories include an atomic social acknowledgement (e.g., approval or disapproval), sharing (e.g., a uniform resource locator (URL), a photograph, a document, a post, etc.), commenting, rating an item, writing a review about the item, posting an item (e.g. a status update, a blog post, a photo, etc.) and marking an item as spam or inappropriate. In some instances, the categories are associated with positive or negative actions. For example, sharing is categorized as positive behavior and marking an item as spam or inappropriate is categorized as negative behavior.

In some instances, a first user interaction can spawn other user interactions that are associated with multiple categories. For example, the first user can approve of a link from a second user and share the link with the first user's family group. In this case, the categorizing engine 205 classifies the first user interaction as an acknowledgement and the second user interaction as sharing. In another example, the first user can post a photo with the first user's photography group and respond to comments about the photo. In this example, the categorizing engine 205 classifies the first user interaction as a post and the second user interaction as commenting.

In some instances, the sharing category of user interactions includes at least one of the following types of user interactions: sharing a URL to a second user in the social network, sharing a comment to the second user, sharing a post to the second user, sharing the URL to a social group in the social network, sharing the comment to the social group and sharing the post to the social group.

In some instances, the categorizing engine 205 transmits the categorized user interactions to the scoring engine 211 and the social bonus engine 207, respectively. In some instances, the categorizing engine 205 stores the first category and the second category of the user interactions as user interaction data on the storage device 106.

The social bonus engine 207 can be software including routines for determining a social bonus score for each user interaction based on the social affinity data as reflected by relationship information between the first user and the recipient. In some instances, the social bonus engine 207 can be a set of instructions executable by the processor 235 to provide the functionality described below for determining the social bonus score. In other instances, the social bonus engine 207 can be stored in the memory 237 of the computing device 200 and can be accessible and executable by the processor 235. The social bonus engine 207 may be adapted for cooperation and communication with the processor 235 and other components of the computing device 200 via signal line 230.

In some instances, the social bonus engine 207 retrieves relationship information from the storage device 106 and generates a social bonus score based at least in part on the relationship information. The relationship information includes, for example, a relationship type, a relationship level and a degree of separation. The social bonus engine 207 generates a higher social bonus score based on a relationship type, for example, when a first user places other users in a friends group than an acquaintance group. The social bonus engine 207 generates a higher social bonus score based on a relationship level, for example, when a first user designates a second user as a best friend rather than just a friend. The social bonus engine 207 generates a higher social bonus score based on a degree of separation, for example, when the user interaction associated with a first user is from someone in the second user's social group instead of someone that the second user receives content from for another reason, for example, because the second user was viewing local user interactions.

The social bonus engine 207 generates the social bonus score for each user and related user pair. For example, a first user publishes a post that is viewed by a second user. The second user is a best friend of the first user. The second user shares the post of the first user with a third user. The third user submits an approval of the post. The social bonus engine 207 applies a higher social bonus score to the second user sharing the post than the third user approving of the post because the first user has a first degree relationship with the second user and only a second degree relationship with the third user. In addition, the social bonus engine 207 applies a higher weight to the second user sharing the post than the third user approving of the post because the first user is a best friend of the second user and is not friends with the third user. In some instances, the social bonus engine 207 applies a higher social bonus score when the degree of separation between the users is a first degree of separation in both directions, i.e. the first user is in a group associated with the second user and the second user is in a group associated with the first user.

The social bonus engine 207 takes into account offline signals by generating a metric for the relationship information. For example, the social bonus engine 207 generates a higher social bonus score for users that are separated by a first degree of separation than users that are separated by two degrees of separation because the first degree users likely had more interactions offline that resulted in a higher degree of trust between the users.

In some instances, the social bonus engine 207 regularly updates the social bonus scores in response to a change in the social affinity data. For example, if a first user removes the second user from a group or stops being friends with the second user, the social bonus engine 207 no longer generates a social bonus score for the second user. In some instances, the social bonus engine 207 generates a negative social bonus score in the above example because the first user has indicated an active dislike for the second user's user interactions.

The learning engine 209 can be software including routines for predicting the trustworthiness or untrustworthiness of user interactions using machine learning or regression analysis. In some instances, the learning engine 209 can be a set of instructions executable by the processor 235 to provide the functionality described below for generating a learning result. In other instances, the learning engine 209 can be stored in the memory 237 of the computing device 200 and can be accessible and executable by the processor 235. The learning engine 209 can be adapted for cooperation and communication with the processor 235 and other components of the computing device 200 via signal line 232.

The learning engine 209 develops algorithms that improve automatically through feedback, by updating the algorithms based on empirical data. The learning engine 209 receives user activities from the processing unit 201 that are associated with trustworthy or untrustworthy users and extrapolates which user interactions are indicative of positive or negative behavior.

In some instances, the learning engine 209 conducts a regression analysis, for example, a logistic regression. From the regression analysis, the learning engine 209 takes advantage of empirical data (e.g., the first set of user activities, the second set of user activities, etc.) to capture characteristics of interest (e.g., probability distribution), determines parameter variations based on the characteristics, and generates an output to include the parameter variations. For example, the learning engine 209 uses the regression method to process relationships between different types of user interactions, investigates the unknown underlying probability distribution of the first weights and the second weights associated with the different types of user interactions, and generates adjustments to the first weights and the second weights as an output.

In some instances, the learning engine 209 uses a logistic function as a regression function to perform a logistic regression. In other instances, the learning engine 209 uses a linear function or other non-linear functions as regression functions to perform a linear regression or non-linear regressions. In some instances, the learning engine 209 determines an optimal parameter vector (e.g., the first weight, the second weight) based on least square methods.

In other instances, the learning engine 209 performs machine learning that automatically learns to recognize complex patterns from the plurality sets of user activities and makes intelligent decisions that help improve the accuracy of the reputation score for the first user. The learning engine 209 receives a set of user activities and training data that identifies which user interactions are associated with trustworthy users and which user interactions are associated with untrustworthy users. The learning engine 209 generates categories of identified user interactions associated with the user and data related to the user interactions. The related data includes relationship information, other users' activity data and other information (e.g., timing, ratings, etc.). The learning engine 209 extracts features from the training data including the identified user interactions and the related data to generate an updated reputation score for the user.

In some instances, the learning engine 209 extracts one or more features from the identified user interactions and uses the one or more features to determine changes applied in calculating an updated reputation score. For example, if the learning engine 209 learns that when a certain proportion of a user's posts are marked as spam and the proportion increases over time, the learning engine 209 determines that these user interactions are indicative of an untrustworthy user. As a result, the learning engine 209 can significantly increase the first weight or decrease the base score associated with the identified user behavior.

In some instances, the learning engine 209 learns from other information (e.g., time information) retrieved from the storage device 106. For example, the learning engine 209 determines user metric data based at least in part on time information and extracts one or more features from the user metric data. The user metric data describes user metrics including time to first click, user interaction time, time between a first user interaction and a current user interaction and number of user interactions in a certain time period. The learning engine 209 uses the user metric data to determine features that are useful for updating the reputation score of the first user. For example, the learning engine 209 determines that a number of user interactions associated with the first user occurred in a certain time period is below a threshold. The learning engine 209 learns from this information that the first user is not an active user and thus lowers one or more of the first weights, the second weights, the first base score and the second base score. In some instances, the learning engine 209 transmits user metric data for storage on the storage device 106.

The learning engine 209 also extracts one or more features from combined analysis of user interactions and related data. For example, the learning engine 209 determines user metric data including that a large number of user interactions occurred in a certain time period. The learning engine 209 learns from the user metric data that either the first user is an active user or the first user is a spammer. The learning engine 209 also determines from other users' activity data that more than one user interaction associated with the first user can be highly rated by other users. Considering this information from the other users' activities, the learning engine 209 learns that the first user can be more likely an active user instead of a spammer. As a result, the learning engine 209 outputs a learning result to the scoring engine 211 that results in an increased reputation score for the first user.

In some instances, the learning engine 209 processes user metric data based at least in part on the user interactions associated with users, determines at least one set of user metrics having a common characteristic that facilitates feature extraction and extracts one or more features from the at least one set of user metrics. For example, the learning engine 209 processes other user metrics collected over time and identifies a time between users receiving user interactions and the users clicking on the user interaction and compares the times to the known perception of the users regarding the user interaction. For example, users that found the user interaction to be interesting took an average of three minutes to click on the user interaction and users that found the user interaction to be uninteresting took an average of ten minutes to click on the user interaction. The learning engine 209 therefore learns that a user is less trustworthy if it takes longer than ten minutes for the other users to click on the user interaction because the recipients find the user interaction to be uninteresting. In some instances, the learning engine 209 stores the at least one set of user activities on the storage device 106 as related user activity data.

In some instances, the learning engine 209 generates an output including at least one adjustment for at least one of the weights and base scores. The learning engine 209 determines an amount of the adjustment based on a plurality of criteria, for example, a comparison between types of user interactions, a distance from a threshold, etc. The learning engine 209 transmits the output to the scoring engine 211.

The scoring engine 211 can be software including routines for generating reputation scores for users. In some instances, the scoring engine 211 can be a set of instructions executable by the processor 235 to provide the functionality described below for generating base scores and weights associated with the base scores and summing the base scores and weights to generate the reputation score. In other instances, the scoring engine 211 can be stored in the memory 237 of the computing device 200 and can be accessible and executable by the processor 235. The scoring engine 211 can be adapted for cooperation and communication with the processor 235 and other components of the computing device 200 via signal line 234.

In some instances, the scoring engine 211 generates a first reputation score from information received from the processing unit 201, the categorizing engine 205 and the social bonus engine 207 and at least one updated reputation score (e.g., a second reputation score) from the information received from the learning engine 209. For the first reputation score, the scoring engine 211 receives user interactions and related user activities (e.g. reactions to the user interactions) from the processing unit 201 or the scoring engine 211 receives categorized user interactions from the categorizing engine 205. The scoring engine 211 receives social bonus scores from the social bonus engine 207.

For the updated reputation score, the scoring engine 211 receives additional user interactions and the base scores and weights associated with the additional user interactions from the learning engine 209. The scoring engine 211 generates the updated score based at least in part on a learning result received from the learning engine 209. In some instances, the learning result includes adjustments for at least one of the weights and base scores calculated for the first reputation score. The scoring engine 211 computes a new reputation score according to the adjustments. The first reputation score and the updated reputation score are described in more detail below with reference to FIGS. 3, 4A, 4B and 5.

In order to compute a reputation score that measures the trustworthiness of the user, the scoring engine 211 determines a base score and a weight for each type of user interaction included in the category. The scoring engine 211 applies a score for each action, for example, approvals receive 1-2 points, disapprovals receive −1 to −2 points, sharing receives 2-5 points, rating an item receives 2-5 points, rating an item as spam receives −2 to −5 points, marking a post as spam or inappropriate receives −5 to −10 points, etc. In some instances, the scoring engine 211 applies the base score to a type of user interaction associated with a category to determine a level of negative or positive effect that the user interaction has on the trustworthiness of the user. The scoring engine 211 normalizes the base scores according to a scale. For example, the scoring engine 211 determines a scale between −10 points to 10 points, and assigns a base score of −1 point to a sum of all atomic social acknowledgements (e.g., receiving approval for a link results in 1 point and receiving disapproval of a photo results in −2 points), 5 points for sharing (e.g., a URL or a comment), 2 points for rating an item and 5 points for writing a review about an item.

In some instances, the scoring engine 211 scores related user activity, which is retrieved as related user activity data from storage device 106. This includes, for example, other users' reactions to user interactions that include posts, comments, shares, etc.

The scoring engine 211 applies a weight to the user interactions and related user activities. In some instances, the scoring engine 211 assigns the same weight to different categories and even the same weight to different types of user interactions within the same category (e.g., a post of text is weighted the same as a post that includes a photo). In other instances, the scoring engine 211 assigns different weights to different types of user interactions in the same category to represent the relative strength of one type of user interaction compared to other types of user interactions in the same category. For example, the scoring engine 211 assigns a first weight of 0.4 to sharing a URL and a second weight of 0.8 to a rating marked as spam to indicate that the latter type of user interaction can be more important when calculating a reputation score for the user. Where the base score for the type of rating can be for marking spam as negative, the larger first weight for the type of rating marked as spam means more penalties in calculating the reputation score and, as a result, the spam marking contributes to a lower reputation score.

The scoring engine 211 generates a reputation score for the user by combining the base scores and weights using a scoring function. The scoring engine 211 also receives an output from the learning engine 209 and generates at least one updated reputation score for the user based at least in part on the output. In some instances, the scoring function uses the following equation:

$$\text{reputation score} = \log(\alpha \beta_{i=1}^{n} x) \tag{1}$$

where the reputation score is the log of the weight ($\alpha$) times the sum of all user interactions in each category (x). This assumes that all user interactions in a category are associated with the same weight. The equation can easily be changed to associate a different weight with each type of user interaction. The weight (a) is also used to take care of mathematical details regarding the log function, for example, log(x) for $x \leq 1$.

The logarithm can be used to normalize the user interactions by diminishing the marginal utility of a user's action as they interact more and more. The diminishing marginal utility results in a particular user interaction having less of an effect when the first user has a large number of user interactions than when the first user has a small number of user interactions. For example, extremely active users (for example, ten times the average activity) should not be ten times more trustworthy, but could be two to three times more trustworthy.

In some instances, the scoring engine 211 generates a base score for each type of user interaction, generates a base score for related user responses to the user interaction, generates a social bonus score for each type of user interaction and combines the scores using the scoring function to compute the reputation score.

In the example where a different weight is applied to each type of user interaction, the scoring engine 211 multiplies the base score for each type of user interaction by the weight associated with that type of user interaction and, if there are multiple user interactions of the same type, the number of user interactions of that type. If the first category includes four user interactions associated with the first user, for example, three user interactions of sharing URLs and one interaction of indicating that a rating is spam, and if the first weight and the first base score corresponding to sharing URLs are 0.4 and 5 points, respectively, and if the second weight and the second base score corresponding to a rating marked as spam are 0.8 and −4 points, respectively, the scoring engine 211 computes that the reputation score for the user interaction for sharing URLs as 0.4×5×3=6 and the reputation score for the type of rating marked as spam is 0.8×(−4)×1=−3.2. Thus, the total reputation score for the four user interactions is 2.8.

The scoring engine 211 adds a social bonus score to the equation that is received from the social bonus engine 207 for each user and recipient pair. For example, using the above example, the reputation score with the added social bonus score is 7.8.

Once the scoring engine 211 generates the reputation score, the scoring engine 211 transmits the reputation score to the social network engine 203, which excludes the user interaction if the reputation score falls below a threshold. In some instances, the scoring engine 211 transmits the reputation score to other data sources connected to the network 105, for example, the search server 135, the third-party server 139 and the messaging server 141. One application of the reputation score is in ecommerce review platforms. For example, if the first user is an owner of an online store, a high reputation score of the first user positively affects reviews for the products listed in the online store. The high reputation score also leads to a high rank of a user among other users in local businesses.

Another application of the reputation score is to combat spam. For example, the lower the reputation score, the more likely it is that the user is a spammer. In addition, a reputation score can change over time to indicate that the user has become a spammer. Other applications of the reputation score include marketing suggestions, online research, etc.

The user interface engine 213 can be software including routines for generating a user interface that displays user profiles (e.g. posts, name, education, work history), user inputs and a social network (e.g. posts, photos, videos, comments). In some instances, the user interface engine 213 can be a set of instructions executable by the processor 235 to provide the functionality described below for generating the user interface. In other instances, the user interface engine 213 can be stored in the memory 237 of the computing device 200 and can be accessible and executable by the processor 235. The user interface engine 213 can be adapted for cooperation and communication with the processor 235 and other components of the computing device 200 via signal line 236.

In some instances, the user interface engine 213 generates graphical data for displaying a user interface that includes a user profile for a user. The user profile includes a reputation score for the user. This reputation score can be public if the user profile can be configured to be visible to the public. In other instances, the user interface engine 213 generates a user interface that does not include the reputation score for the user in order to protect user's privacy and avoid misuse of the score, but instead only generates graphical data for displaying a user interface with the reputation score to an administrator.

In other instances, each time a second user accesses user-generated content that was generated by the first user in a user interaction, the user interface engine 213 generates graphical data for displaying a reputation score of the first user on a user interface. For example, when the second user opens a webpage to view a comment written by the first user, the user interface engine 213 generates graphical data for displaying the reputation score of the first user on the webpage. In some instances, the reputation score is color coded or symbolically coded so that, for example, a high reputation score can be associated with a positive color, e.g. yellow or a positive symbol, e.g. a star.

The user interaction data includes data describing one or more types of user interactions associated with a first user. In some instances, the user interaction data is organized by categories before it is stored in storage device 106. For example, user interaction data can be categorized as sharing, a social atomic acknowledgement, a comment or a rating.

The relationship information includes data describing social affinity between users. In some instances, the relationship information includes data generated from an analysis of a social graph.

The related user activity data includes data describing other users' activities that are performed based at least in part on the user interactions included in the user interaction data. For example, if the user interaction data includes a user interaction that a first user wrote a comment on a post, the related user activity data includes data describing that other users acknowledged the comment by approving or disapproving the comment.

The user metric data includes data describing one or more user metrics associated with one or more user interactions included in the user interaction data. For example, the user metric data includes a time between loading data and first clicking on the data, user interaction time, time between a first user interaction and a current user interaction, number of user interactions in a certain time period, etc.

Figure 3:
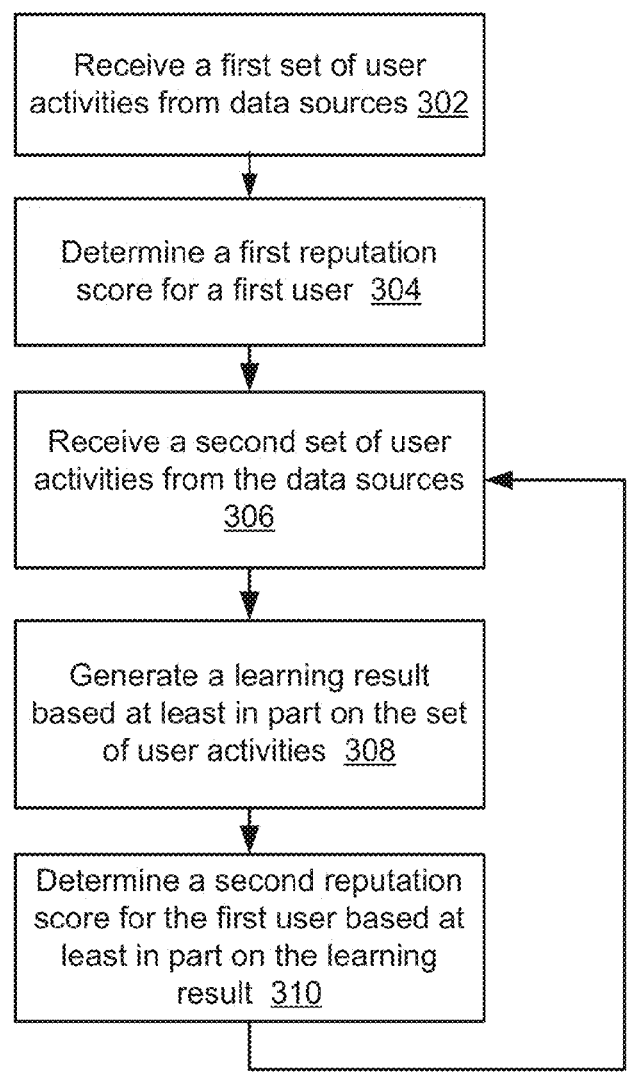
FIG. 3 is a flowchart of an example method for generating a reputation score.

Referring now to FIGS. 3, 4A, 4B, 5, 6 and 7, various example methods and graphic representations of example user interfaces of the specification will be described. FIG. 3 is a flowchart 300 of an example method for generating a reputation score using a scoring application 103. The scoring application 103 includes a processing unit 201, a learning engine 209 and a scoring engine 211. The processing unit 201 receives 302 a first set of user activities from data sources. The processing unit 201 identifies user interactions associated with a first user in a social network from the first set of user activities. The scoring engine 211 determines 304 a first reputation score for the first user based at least in part on the identified user interactions. The processing unit 201 receives 306 a second set of user activities from the data sources and transmits the second set of user activities to the learning engine 209. The learning engine 209 generates 308 a learning result based at least in part on the second set of user activities. In some instances, the learning engine 209 receives a designation of which user activities are associated with a trustworthy user and which activities are associated with an untrustworthy user. The learning engine 209 applies machine learning or regression analysis of user metric data to make predictions about how to score user interactions. The scoring engine 211 determines 310 a second reputation score based at least in part on the learning result. The second reputation score can be an updated score of the first reputation score. Steps 306-310 are repeated over time in response to receiving additional information belonging to the second set of user activities to obtain at least one updated reputation score.

Figure 4A:
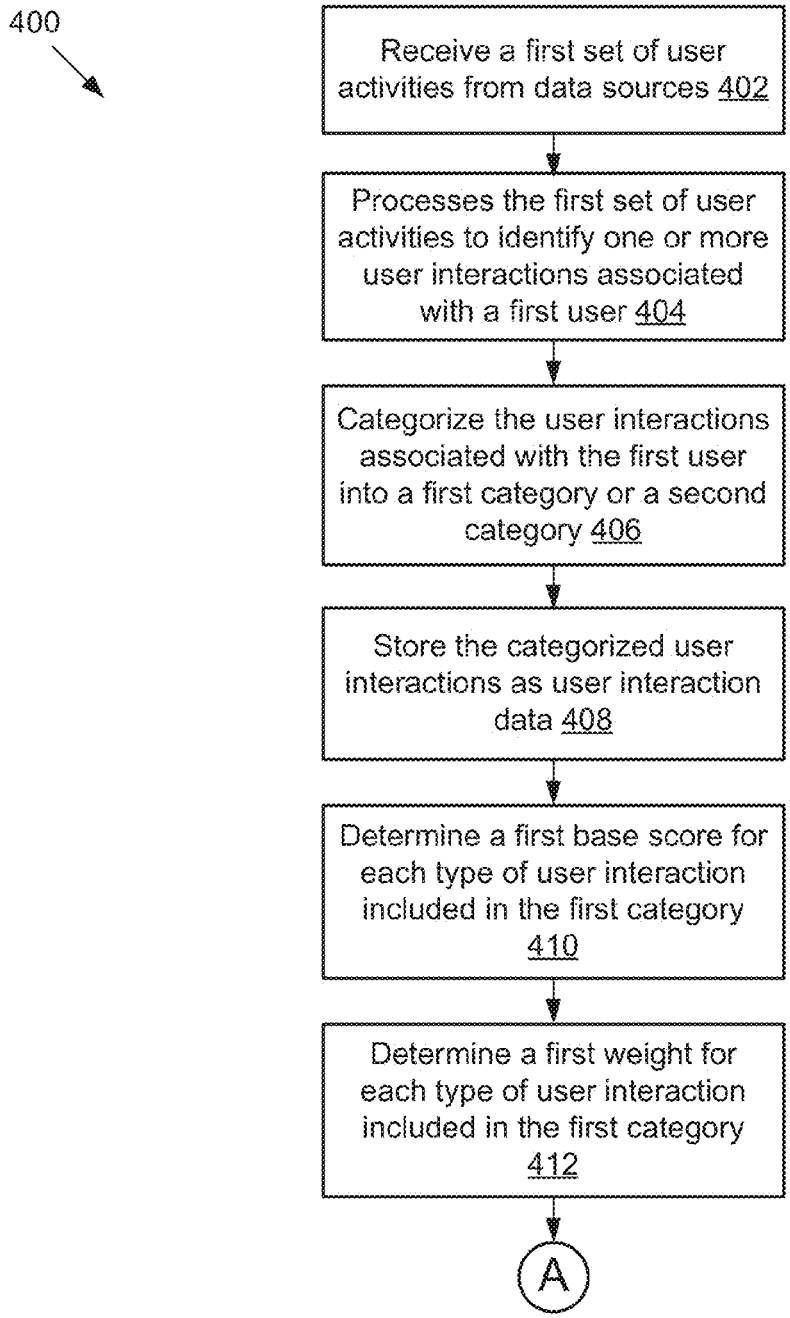
FIGS. 4A and 4B are flowcharts of an example method for generating a reputation score.
Figure 4B:
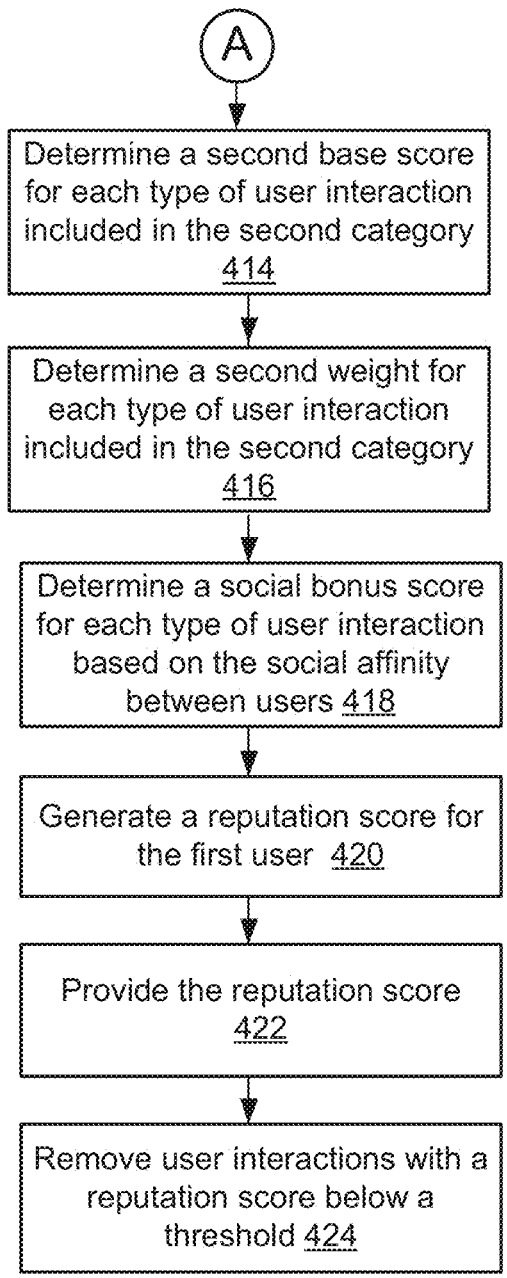

FIGS. 4A and 4B are flowcharts 400 of an example method for generating a first reputation score for a first user in a social network using a scoring application 103. The scoring application 103 includes a processing unit 201, a social network engine 203, a categorizing engine 205, a social bonus engine 207, a learning engine 209, a scoring engine 211 and a user interface engine 213.

The processing unit 201 receives 402 a first set of user activities from data sources. The data sources include search (for example, web, video, news, maps, alerts), entertainment (for example, news, video, a personalized homepage, blogs, a reader, gadget subscriptions), social activity (for example, interactions through email, profile information, text messaging i.e., short message service (SMS), microblog, comments on photos, a social graph and other social networking information) and activity on third-party sites (for example, websites that provide ratings, reviews and social networks where users indicate that they approve of content).

The processing unit 201 processes 404 the first set of user activities to identify one or more user interactions associated with the first user. Responsive to identifying the one or more user interactions, the processing unit 201 also processes the first set of user activities to obtain data related to the one or more user interactions. In some instances, the related data includes relationship information, related user activity data, user metric data, etc. The processing unit 201 transmits the identified user interactions and the related data to the categorizing engine 205.

The categorizing engine 205 categorizes 406 the user interactions associated with the first user into a first category or a secondary category. In some instances, the categorizing engine 205 classifies the user interactions associated with the first user into different types of user interactions, and categorizes each type of user interaction into a first category or a second category. In some instances, the categorizing engine 205 stores 408 the categorized user interactions as user interaction data in the storage device 106.

In some instances, the first category includes at least one of the following types of user interactions: an atomic social acknowledgement, sharing, posting, commenting, sharing, rating an item, writing a review and marking or flagging an item as spam or inappropriate. The atomic social acknowledgement includes approval or disapproval of content. The sharing includes sharing a uniform resource locator (URL), a comment, a post, or a photo. Commenting includes commenting on a post, a photo, a shared item, etc. Marking an item as spam includes marking a post, a link, a user, a comment, a photo, a rating, etc. The scoring engine 211 determines 410 a first base score for each type of user interaction included in the first category. In some instances, the scoring engine 211 normalizes the first base scores and sets the first base scores according to a scale. The scoring engine 211 determines 412 a first weight for each type of user interaction included in the first category. In some instances, the scoring engine 211 assigns a first weight to entire first category to represent the strength of the first category as compared to the second category. Each type of user interactions has the same value. In other instances, the scoring engine 211 assigns a first weight to a type of user interaction in the first category to represent the relative strength of the type of user interactions compared to the other types of user interactions in the first category.

The scoring engine 211 determines 414 a second base score for each type of user interaction included in the second category. The scoring engine 211 determines 416 a second weight for each type of user interaction included in the second category. The user interaction in the second category can be an atomic social acknowledgement, sharing, posting, commenting, sharing, rating an item, writing a review and marking or flagging an item as spam or inappropriate as long as it is a different user interaction category than the first user interaction category. The social bonus engine 207 determines 418 a social bonus score for each user and recipient pair. In some instances, the social bonus engine 207 normalizes the social bonus scores.

The scoring engine 211 generates 420 a reputation score for the first user by combining the first base scores, the second base scores, the first weights and the second weights using a scoring function that takes the sum of each category of user interaction, multiplies it times the weight and sums up the totals. In some instances, the scoring engine 211 generates the reputation score by taking the log of the sum of the user interactions multiplied by their individual weights.

The user interface engine 213 receives the reputation score from the scoring engine 211 to present 422 the reputation score on a user interface. In some instances, the user interface engine 213 generates graphic data for displaying a user interface that includes a user profile of the first user. The user profile includes a reputation score for the first user. In other instances, each time when a second user accesses user-generated content that was generated by the first user in a user interaction, the user interface engine 213 generates graphical data for displaying a reputation score of the first user on a user interface.

The scoring engine 211 transmits the reputation score to the social network engine 203, which removes 424 user interactions with a reputation score below a threshold. For example, if the scale for the reputation score is 1 to 100 and the reputation score is below 50, the social network engine 203 removes the content from the social network. In some instances, because the scoring engine 211 incorporates a social bonus score that is particular to each recipient and the recipient's relationship with the user that created the user interaction, the user interaction can be excluded from the social network content for one user and not another. For example, the extra boost from the social bonus score when a first user that generated the user interaction that has social affinity to a second user could be enough to exceed the threshold. In one instance, the social network engine 203 instructs the user interface engine 213 to generate graphical data for displaying the stream of content with the reputation score of the user that created the content for each user interaction.

Figure 5:
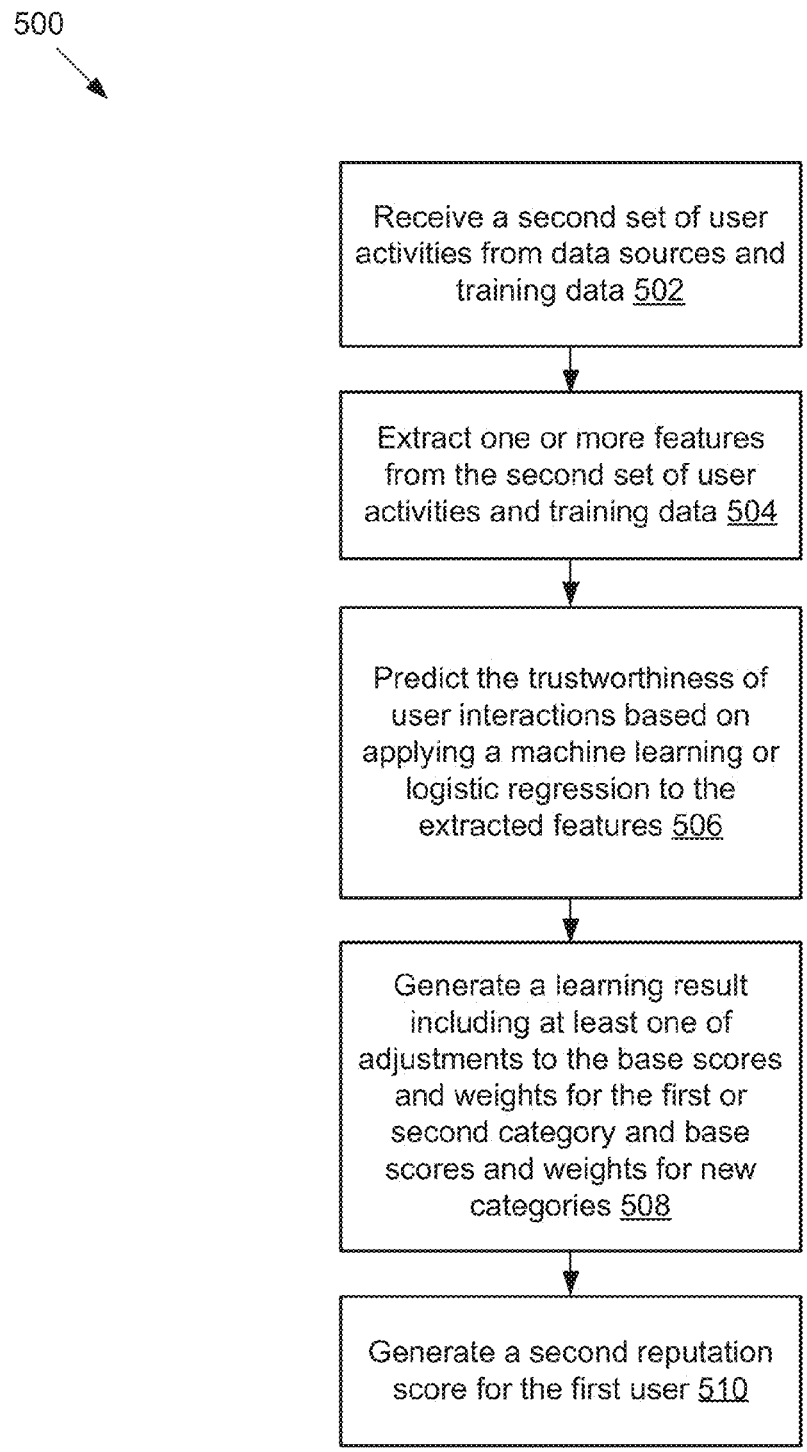
FIG. 5 is a flowchart of an example method for generating an updated reputation score.

FIG. 5 is a flowchart 500 of an example method for generating a second reputation score for the first user in the social network. The second reputation score is an updated score of a first reputation score generated based at least in part on applying machine learning or regression analysis. The first reputation score is generated according to the method 400 described in FIGS. 4A and 4B. The learning engine 209 receives 502 a second set of user activities from data sources that are associated with multiple users and training data. In some instances, the first set and the second set of user activities are the same. In other instances, the second set of user activities includes updated information. In other instances, the second set of user activities includes user metrics. The training data includes, for example, an indication of which user interactions in the second set of user activities are associated with a trustworthy user and which user interactions are associated with an untrustworthy user.

The learning engine 209 extracts 504 one or more features from the second set of user activities and the training data.

The learning engine 209 determines related user activity data from the user activities that are performed based at least in part on the user interactions. The learning engine 209 predicts 506 the trustworthiness of user interactions based on applying a machine learning or regression analysis to the extracted features. The learning engine 209 generates 508 a learning result including at least one of adjustments to the base scores and weights for the first or second category and base scores and weights for new categories. The learning engine 209 transmits the learning result to the scoring engine 211, which generates 510 the second reputation score for the first user.

Figure 6:
FIG. 6 is a graphic representation of an example user interface for displaying a reputation score for a user.

FIG. 6 is a graphic representation of an example user interface 600 generated by the user interface engine 213. In this example, the user interface 600 includes a user profile for a user Melissa G. The user profile includes a reputation score 602 for Melissa according to only the base scores multiplied by their weights. The social bonus scores 608 are not included in the reputation score 602 because they are unique to the relationship between Melissa and other users according to their particular social affinity. Different base scores 604 are determined for different types of user interactions included in different categories associated with Melissa. For example, the base score for marking posts as spam 606 is −20. Different social bonus scores 608 are determined for different users associated with Melissa. For example, Sara T. is in one of Melissa's groups and Melissa is in one of Sara's groups and, as a result, the social bonus score 608 is 10. In another instance, Brett D. is identified as a business associate of Melissa's and, as a result, only receives a social bonus score of 5. Although the scores are visible in this example, in some instances the scores are only visible to administrators or not visible at all.

Figure 7:
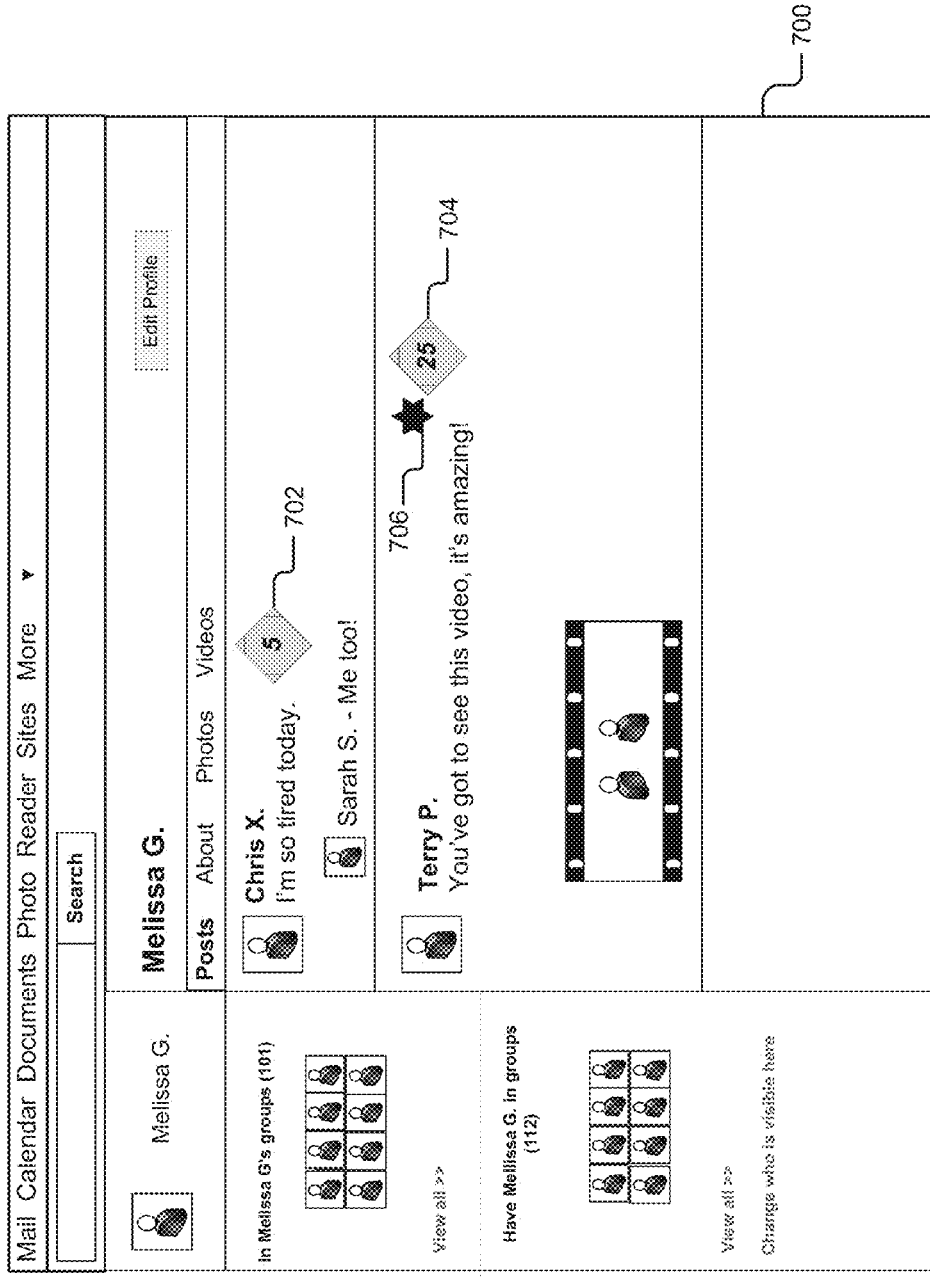
FIG. 7 is a graphic representation of an example user interface for displaying an updated reputation score for a user.

FIG. 7 is a graphic representation of an example user interface 700 generated by the user interface engine 213. In this example, the user interface 700 includes posts for Melissa that include the reputation score for users that appear in Melissa's stream of content on the social network. The scoring engine 211 generates a reputation score 702 of five for Chris X.'s post based on the user interactions, weights and social bonus score. The scoring engine 211 generates a reputation score 704 of 25 for Terry P.'s post and highlights the post with a star 706 to alert Melissa that she should pay more attention to Terry's video because he has such a high reputation score 704.

In the following description, for purposes of explanation, numerous specific details are set forth in order to provide a thorough understanding of the specification. It will be apparent, however, to one skilled in the art that the technology can be practiced without these specific details. In other instances, structures and devices are shown in block diagram form in order to avoid obscuring the description. For example, the specification is described in some instances above with reference to user interfaces and particular hardware. However, the description applies to any type of computing device that can receive data and commands, and any peripheral devices providing services.

Reference in the specification to "some instances" or "an instance" means that a particular feature, structure, or characteristic described in connection with the instance is included in at least some instances of the description. The appearances of the phrase "in some instances" in various places in the specification are not necessarily all referring to the same instance.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The specification also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to implementation in any specific programming language, or for any specific operating system or environment. Accordingly, the disclosure is intended to be illustrative, but not limiting, of the scope of the specification, which is set forth in the following claims.

What is claimed is:

1. A method comprising:
   receiving a first set of user activities from data sources;
   processing, with one or more computing devices, the first set of user activities to identify user interactions associated with a first user of a social network;
   classifying, with the one or more computing devices, the user interactions associated with the first user into a first category and a second category;
   determining a first base score and a first weight for each type of user interaction in the first category of user interactions, at least one of the user interactions being normalized for the first category;
   determining a second base score and a second weight for each type of user interaction in the second category of user interactions, at least one of the user interactions being normalized for the second category;
   generating a social bonus score based on social affinity data between the first user and a second user in the social network;
   determining, with the one or more computing devices, a first reputation score for the first user in relation to the second user by combining the first base score and the first weight, the second base score and the second weight and the social bonus score;
   determining a second reputation score for the first user in relation to a third user by combining the first base score and the first weight, and the second base score and the second weight, the first user being unconnected to the third user in the social network;
   including the user interactions in a first stream of content associated with the second user based on the first reputation score exceeding a threshold reputation score; and
   excluding the user interactions in a second stream of content associated with the third user based on the second reputation score failing to exceed the threshold reputation score.

2. The method of claim 1, wherein normalizing at least one of the user interactions comprises determining a diminishing marginal utility of the user interactions for the at least one category.

3. The method of claim 1, further comprising:
   receiving a second set of user activities from the data sources, the second set of user activities including training data that identifies user activities associated with a trustworthy user and user activities associated with an untrustworthy user;
   generating a learning result based on the second set of user activities; and
   determining, with the one or more computing devices, a third reputation score for the first user based on the learning result.

4. The method of claim 3, further comprising:
   extracting features from the first set and the second set of user activities; and
   wherein the third reputation score includes at least one adjustment for at least one of a first base score, a first weight, a second base score and a second weight based on the extracted features.

5. The method of claim 4, wherein extracting the features comprises:
   determining user metric data for the user interactions; and
   wherein the user metric data includes at least one of time to first click, user interaction time, time between a first user interaction and a current user interaction and a number of user interactions in a certain time period.

6. The method of claim 3, wherein the learning result is generated based on machine learning or regression analysis.

7. The method of claim 1, wherein the first user and the second user have a first-degree connection in the social network and responsive to the second user removing the first-degree connection between the second user and the first user, removing the social bonus from the first reputation score.

8. The method of claim 7, wherein the first weight is further divided into a third weight for a first type of user interaction in the first category and a fourth weight for a second type of user interaction in the first category.

9. The method of claim 1, wherein determining the first reputation score further comprises determining related user activity data for the user interactions, the related user activity data including other users' reactions to user interactions created by the first user.

10. The method of claim 1, further comprising generating a user interface to display the user interaction to the second user, the user interface including the first reputation score.

11. A system for generating a reputation score, the system comprising:
one or more processors; and
a memory storing instructions that, when executed, cause the system to:
process the first set of user activities to identify user interactions associated with a first user of a social network;
classify the user interactions associated with the first user into a first category and a second category;
determine a first base score and a first weight for each type of user interaction in the first category of user interactions, at least one of the user interactions being normalized for the first category;
determine a second base score and a second weight for each type of user interaction in the second category of user interactions, at least one of the user interactions being normalized for the second category;
generate a social bonus score based on social affinity data between the first user and a second user in the social network
determine a first reputation score for the first user in relation to the second user by combining the first base score and the first weight, the second base score and the second weight and the social bonus score;
determine a second reputation score for the first user in relation to a third user by combining the first base score and the first weight, and the second base score and the second weight, the first user being unconnected to the third user in the social network;
include the user interactions in a first stream of content associated with the second user based on the first reputation score exceeding a threshold reputation score; and
exclude the user interactions in a second stream of content associated with the third user based on the second reputation score failing to exceed the threshold reputation score.

12. The system of claim 11, wherein normalizing at least one of these user interactions comprises determining a diminishing marginal utility of the user interactions for the at least one category.

13. The system of claim 11, wherein the instructions are further configured to cause the system to:
receive a second set of user activities from the data sources, the second set of user activities including training data that identifies user activities associated with a trustworthy user and user activities associated with an untrustworthy user;
generating a learning result based on the second set of user activities; and
determining a third reputation score for the first user based on the learning result.

14. The system of claim 13, wherein the instructions are further configured to cause the system to extract features from the first set and the second set of user activities; and
wherein the third reputation score includes at least one adjustment for at least one of a first base score, a first weight, a second base score and a second weight based on the extracted features.

15. The system of claim 14, wherein extracting the features comprises:
determining user metric data for the user interactions; and
wherein the user metric data includes at least one of time to first click, user interaction time, time between a first user interaction and a current user interaction and a number of user interactions in a certain time period.

16. The system of claim 13, wherein the learning result is generated based on machine learning or regression analysis.

17. A computer program product for generating a reputation score comprising a non-transitory computer usable medium including a computer readable program, wherein the computer readable program when executed on a computer causes the computer to:
receive a first set of user activities from data sources;
processes the first set of user activities to identify user interactions associated with a first user of a social network;
classify the user interactions associated with the first user into a first category and a second category;
determine a first base score and a first weight for each type of user interaction in the first category of user interactions, at least one of the user interactions being normalized for the first category;
determine a second base score and a second weight for each type of user interaction in the second category of user interactions, at least one of the user interactions being normalized for the second category;
generate a social bonus score based on social affinity data between the first user and a second user in the social network;
determine a first reputation score for the first user in relation to the second user by combining the first base score and the first weight, the second base score and the second weight and the social bonus score;
determine a second reputation score for the first user in relation to a third user by combining the first base score and the first weight, and the second base score and the second weight, the first user being unconnected to the third user in the social network;
include the user interactions in a first stream of content associated with the second user based on the first reputation score exceeding a threshold reputation score; and
exclude the user interactions in a second stream of content associated with the third user based on the second reputation score failing to exceed the threshold reputation score.

18. The computer program product of claim 17, wherein normalizing at least one of these user interactions comprises determining a diminishing marginal utility of the user interactions for the at least one category.

19. The computer program product of claim 17, wherein the computer readable program when executed on the computer further causes the computer to:
receive a second set of user activities from the data sources, the second set of user activities including training data that identifies user activities associated with a trustworthy user and user activities associated with an untrustworthy user;
generate a learning result based on the second set of user activities; and
determine a third reputation score for the first user based on the learning result.

20. The computer program product of claim 19, wherein the computer readable program when executed on the computer further causes the computer to extracting features from the first set and the second set of user activities; and wherein the third reputation score includes at least one adjustment for at least one of a first base score, a first weight, a second base score and a second weight based on the extracted features.

* * * * *